(12) United States Patent  (10) Patent No.: US 9,004,272 B2
Ackley, Jr.  (45) Date of Patent: Apr. 14, 2015

(54) METHOD AND APPARATUS FOR TRANSPORTING AND PROCESSING A PLURALITY OF ARTICLES

(75) Inventor: E Michael Ackley, Jr., Mannington, NJ (US)

(73) Assignee: Ackley Machine Corporation, Moorestown, NJ (US)

( * ) Notice: Subject to any disclaimer, the term of this patent is extended or adjusted under 35 U.S.C. 154(b) by 2155 days.

(21) Appl. No.: 11/605,328

(22) Filed: Nov. 29, 2006

(65) Prior Publication Data

US 2007/0125625 A1    Jun. 7, 2007

Related U.S. Application Data

(60) Provisional application No. 60/742,879, filed on Dec. 7, 2005.

(51) Int. Cl.
*B65G 17/16* (2006.01)
*B65G 29/00* (2006.01)
*B65G 17/06* (2006.01)
*B65G 17/36* (2006.01)

(52) U.S. Cl.
CPC ............ *B65G 17/063* (2013.01); *B65G 17/068* (2013.01); *B65G 17/16* (2013.01); *B65G 17/36* (2013.01)

(58) Field of Classification Search
USPC ...................................... 198/867.11
See application file for complete search history.

(56) References Cited

U.S. PATENT DOCUMENTS

| | | | |
|---|---|---|---|
| 2,037,254 A | 4/1936 | Miller | |
| 3,932,245 A | 1/1976 | Erb et al. | |
| 3,942,695 A | 3/1976 | Fleissner | |
| 3,958,683 A * | 5/1976 | Schregenberger | 198/431 |
| 4,528,904 A | 7/1985 | Ackley, Jr. | |
| 4,729,305 A | 3/1988 | Spencer | |
| 4,905,589 A | 3/1990 | Ackley, Jr. | |
| 4,947,979 A * | 8/1990 | Martin et al. | 198/343.1 |
| 5,113,757 A | 5/1992 | Spencer | |
| 5,299,680 A * | 4/1994 | Rhodes | 198/465.2 |
| 5,494,205 A | 2/1996 | Nielsen et al. | |
| 5,630,499 A | 5/1997 | Louden et al. | |
| 5,655,453 A | 8/1997 | Ackley, Jr. | |
| 6,047,156 A | 4/2000 | DeBock et al. | |
| 6,459,061 B1 * | 10/2002 | Kugle et al. | 209/583 |
| 6,581,751 B1 * | 6/2003 | Nickey et al. | 198/379 |
| 7,102,741 B2 | 9/2006 | Ackley, Jr. | |
| 7,114,445 B2 | 10/2006 | Ackley, Jr. | |

* cited by examiner

*Primary Examiner* — Kavel Singh
(74) *Attorney, Agent, or Firm* — Nixon & Vanderhye P.C.

(57) ABSTRACT

An apparatus for transporting and processing a plurality of articles includes a conveyer structured to convey a plurality of articles along a conveyer path and at least one processing station provided along the conveyer path to perform at least one processing operation. The conveyer path includes at least one loop or festoon.

44 Claims, 15 Drawing Sheets

METHOD AND APPARATUS FOR TRANSPORTING AND PROCESSING A PLURALITY OF ARTICLES

CROSS REFERENCE TO RELATED APPLICATION

This application claims the benefit of U.S. Provisional Application No. 60/742,879, filed Dec. 7, 2005, which is incorporated herein by reference in its entirety.

FIELD OF THE INVENTION

The present invention relates to processing of articles, e.g., pharmaceuticals such as caplets and tablets, edible or non-edible articles. In particular, the present invention relates to a method and apparatus for transporting a plurality of articles past at least one processing station.

BACKGROUND OF THE INVENTION

Processing of articles, e.g., pharmaceuticals such as caplets and tablets, edible or non-edible articles, are known in the art. Processing operations typically include marking the articles with indicia, coloring the articles, and/or coating the articles. Processing operations are often performed in a sequential manner wherein articles are conveyed past a first processing unit that performs a first processing operation and then past a second processing unit, downstream from the first processing unit, that performs a second processing operation.

For example, FIGS. 1 and 2 illustrate a known processing apparatus 10 including a conveyer 12 to convey articles along a conveyer path and first and second printing stations 14, 16 provided along the conveyer path to perform first and second printing operations. In FIG. 1, the first and second printing stations 14, 16 each include an ink pan 20, a design roll 22, and an offset printing roll 24 as is known in the art. However, one or both of the first and second printing stations 14, 16 may include an inkjet printer 30 as shown in FIG. 2. Also, the first and second printing stations are located on a portion of the conveyer path which is substantially linear.

During the printing operation, drying of the first printing operation may be required before the second printing operation is performed, e.g., to prevent smearing, smudging, etc. To provide the required drying time between the first and second printing operations, the conveyer speed may be adjusted, i.e., slowed down, and/or the horizontal length of the conveyer path between the first and second printing stations 14, 16 may be adjusted, i.e., lengthened. However, adjusting the conveyer speed slows production and adjusting the horizontal length of the conveyer path between the first and second printing stations 14, 16 increases the size of the apparatus. Thus, there is a need in the art for an improved method and apparatus for transporting a plurality of articles past sequential processing stations that does not suffer from the above-mentioned drawbacks.

SUMMARY OF THE INVENTION

One aspect of the invention relates to a method and apparatus for transporting a plurality of articles in a manner that increases travel time.

Another aspect of the invention relates to a method and apparatus for transporting a plurality of articles past sequential processing stations in a manner that increases the travel time between the sequential processing stations.

Another aspect of the invention relates to an apparatus for transporting and processing a plurality of articles. The apparatus includes a conveyer structured to convey a plurality of articles along a conveyer path and at least one processing station provided along the conveyer path to perform at least one processing operation. The conveyer path includes at least one loop or festoon.

Yet another aspect of the invention relates to a method for transporting and processing a plurality of articles. The method includes conveying the plurality of articles past at least one processing station to perform at least one processing operation, and conveying the plurality of articles along a loop or festoon.

Still another aspect of the invention relates to a conveyer for conveying a plurality of articles along a conveyer path. The conveyer includes a plurality of carrier bars structured to convey the plurality of articles along the conveyer path. Each of the carrier bars includes one or more article receiving pockets along its length. An adjustment mechanism individually adjusts a position of each carrier bar relative to the conveyer path.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Figure 1:
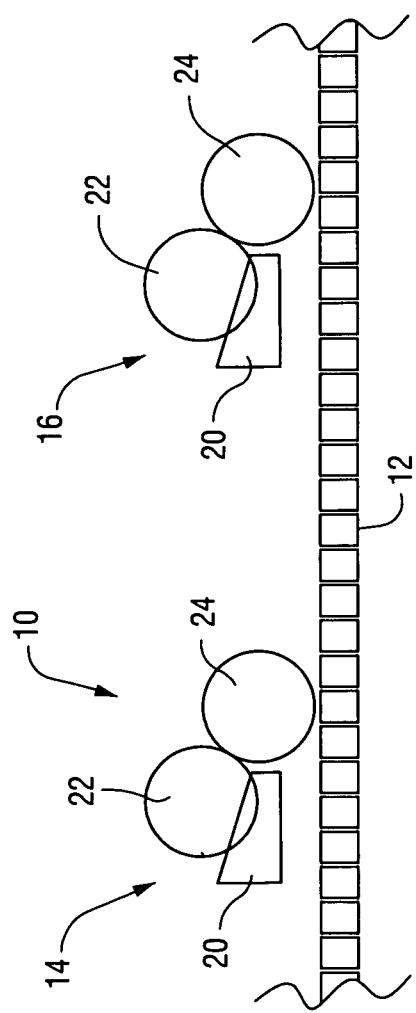
FIG. 1 is a side view of a known apparatus for transporting a plurality of articles past sequential printing stations.
Figure 2:
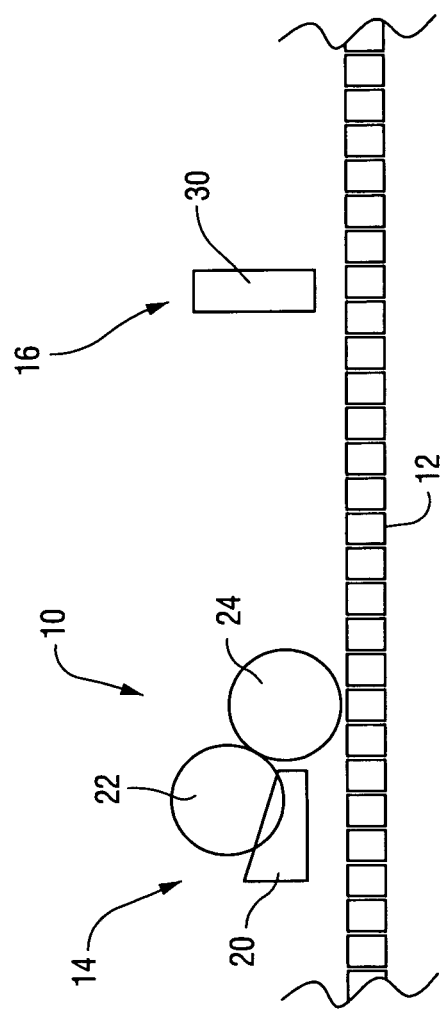
FIG. 2 is a side view of another known apparatus for transporting a plurality of articles past sequential printing stations.
Figure 3:
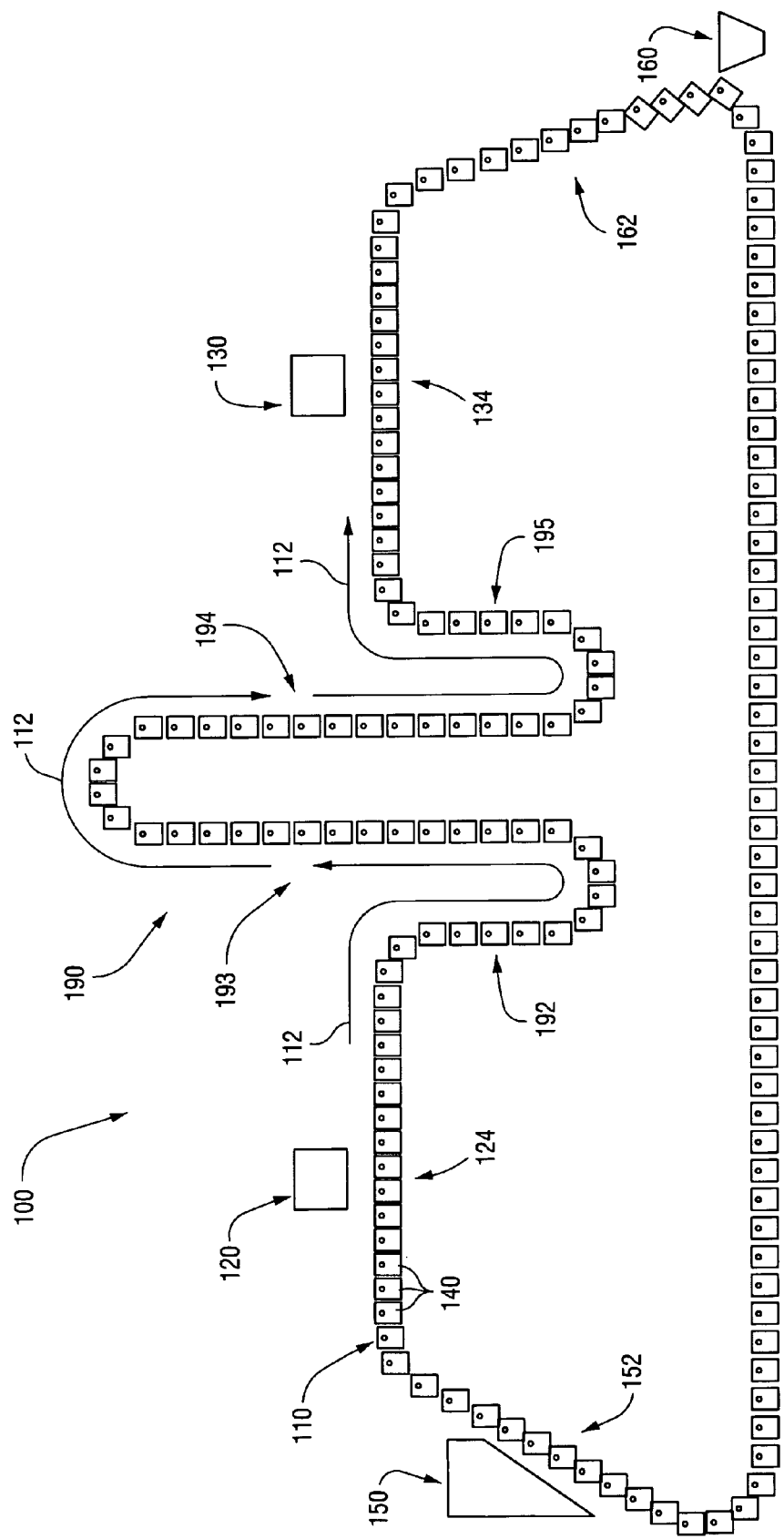
FIG. 3 is a side view of an apparatus for transporting and processing a plurality of articles according to an embodiment of the present invention.

FIG. 3 illustrates an apparatus 100 for transporting and processing a plurality of articles according to an embodiment of the present invention. As illustrated, the apparatus 100 includes a conveyer 110 to convey the articles along a conveyer path 112 and first and second processing stations 120, 130 provided along the conveyer path 112 to perform first and second processing operations. As described in greater detail below, the conveyer 110 is structured such that the conveyer path 112 has a looping, festooning, or curved configuration between the first and second processing stations 120, 130. This arrangement increases the length of the conveyer path 112 between the first and second processing stations 120, 130, thereby increasing the travel time it takes for articles to pass from the first processing station 120 to the second processing station 130. The increased travel time between stations may be used for drying the articles and/or performing other processing operations on the articles, for example.

In an embodiment, the apparatus 100 may include a single processing station along the conveyer path 112 and the looping configuration of the conveyer path 112 may be provided for drying the articles before the conveyer path 112 ends, e.g., articles are dumped by the conveyer 110, so that the articles do not smudge. That is, a conveyer path 112 with a looping configuration may be provided in an apparatus having at least one processing station in order to increase the travel time of the articles, e.g., for drying purposes. The looping configuration may be provided upstream and/or downstream of the at least one processing station. For example, the apparatus may include a processing station, e.g., drying tunnel, along the conveyer path, and the looping configuration may be provided downstream of the processing station. This example need not include a subsequent or second processing station before the articles are removed (e.g., dumped) from the conveyer.

As illustrated in FIG. 3, the conveyer 110 includes a plurality of carrier bars 140 structured to convey a plurality of articles along the conveyer path 112. The articles may be pharmaceutical articles, edible articles, or non-edible articles, and may be in the form of capsules, caplets, pills, tablets, and other spherical, oval, cylindrical, or polygonal shapes, as well as irregularly shaped articles. The conveyer 110 is supported upon a frame that is also structured to support the first and second processing stations 120, 130, a dispenser 150, and a bin 160 where non-acceptable or acceptable articles are collected. Such a frame arrangement is shown in U.S. Pat. Nos. 4,905,589 and 5,655,453, which are each incorporated herein by reference in its entirety.

The dispenser 150, e.g. a feed hopper, is disposed over the conveyer 110 to receive a supply of articles and deliver the articles onto the conveyer 110. As the conveyer 110 is drawn beneath the dispenser 150, the carrier bars 140 will become filled with articles.

Figure 4A:
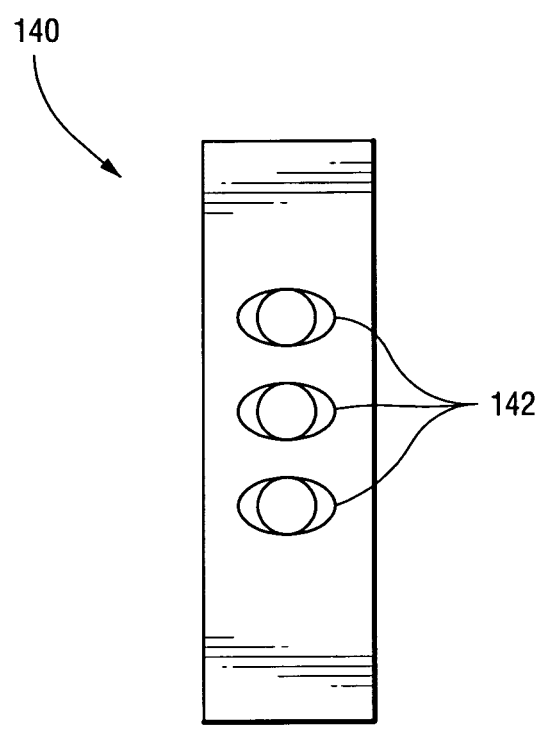
FIG. 4A is a top view of a sample carrier bar for the apparatus shown in FIG. 3.
Figure 4B:
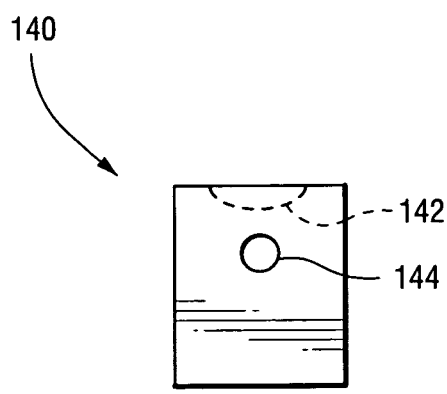
FIG. 4B is a side view of the carrier bar shown in FIG. 4A.

As shown in FIGS. 4A and 4B, each of the carrier bars 140 is provided with one or more article receiving pockets 142 disposed along their length. Each pocket 142 is suitably contoured so as to generally conform to the exterior shape of the article. The pockets 142 may be suitably modified to accommodate any suitable shape and size of article.

The pockets 142 of the carrier bars 140 operate to receive and entrain the articles from the dispenser 150 and move the articles along the conveyer path 112. In the illustrated embodiment, each carrier bar 140 has three pockets 142. However, the carrier bars 140 may be provided with any number of pockets 142 disposed along their length. For example, the number of pockets 142 may be varied by simply varying the number of pockets 142 that are placed in line along the manufactured carrier bars. The pockets 142 may be staggered to achieve an even greater pocket density. Further, it is possible to stagger the pockets 142 along carrier bars having scalloped edges to further increase pocket density and conserve space.

Figure 5:
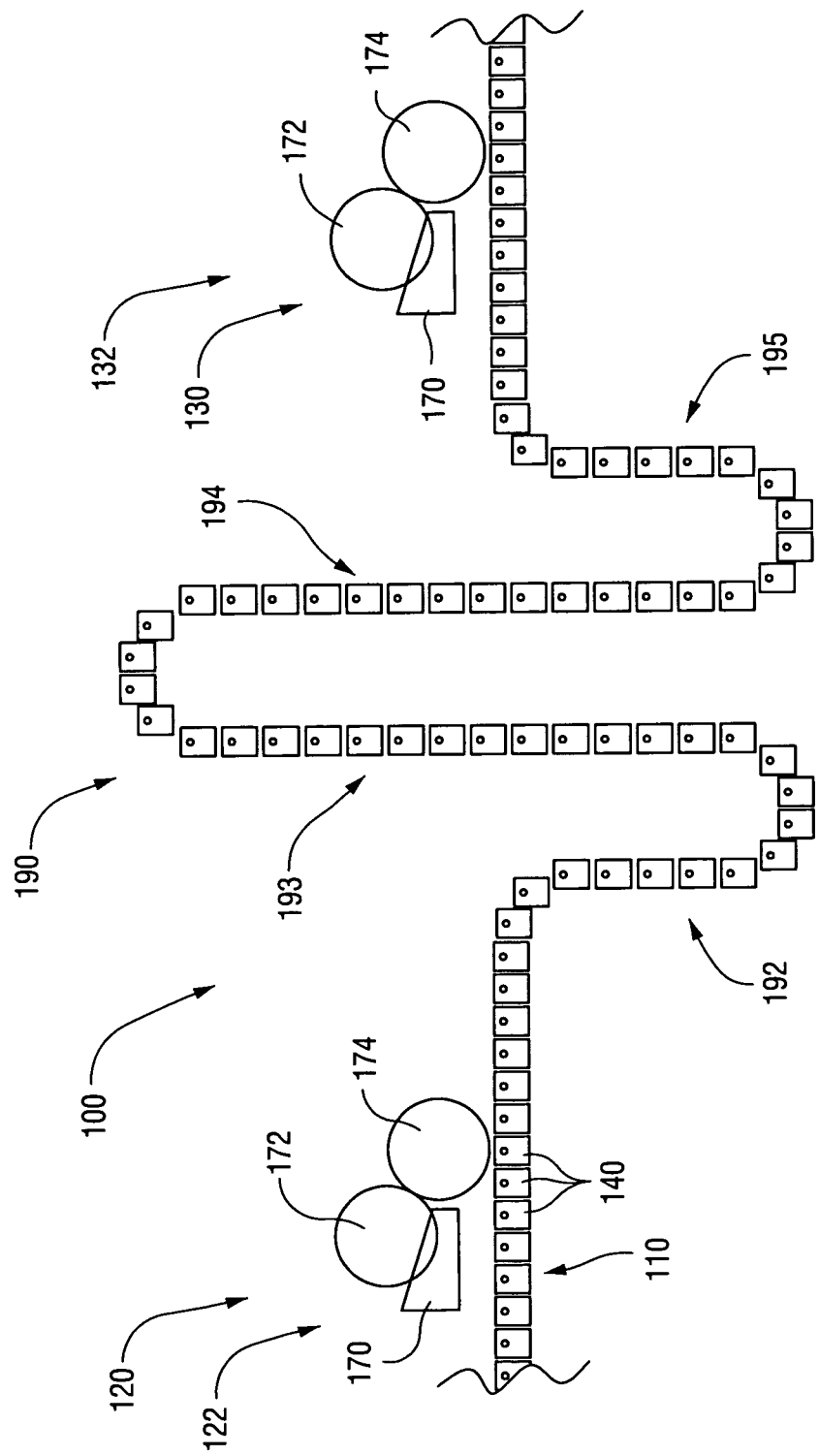
FIG. 5 is a side view of an apparatus for transporting a plurality of articles according to another embodiment of the present invention.

In the illustrated embodiment, the first and second processing stations 120, 130 are in the form of first and second marking apparatuses 122, 132 for marking desired indicia onto the articles. As shown in FIG. 5, each of the first and second marking apparatuses 122, 132 may include an ink pan 170, a design roll 172 that forms the indicia to be applied to the articles (and which is disposed within an appropriate supply of ink in the ink pan 170), and an offset printing roll 174 which is in contact with both the design roll 172 and the articles which are to receive the indicia, for transferring the ink-laden indicia from the design roll 172 to the articles in question. Further details of such a marking apparatus are shown in U.S. Pat. Nos. 4,528,904 and 5,655,453 to Mr. E. Michael Ackley, Jr., which are each incorporated herein by reference in its entirety.

Figure 6:
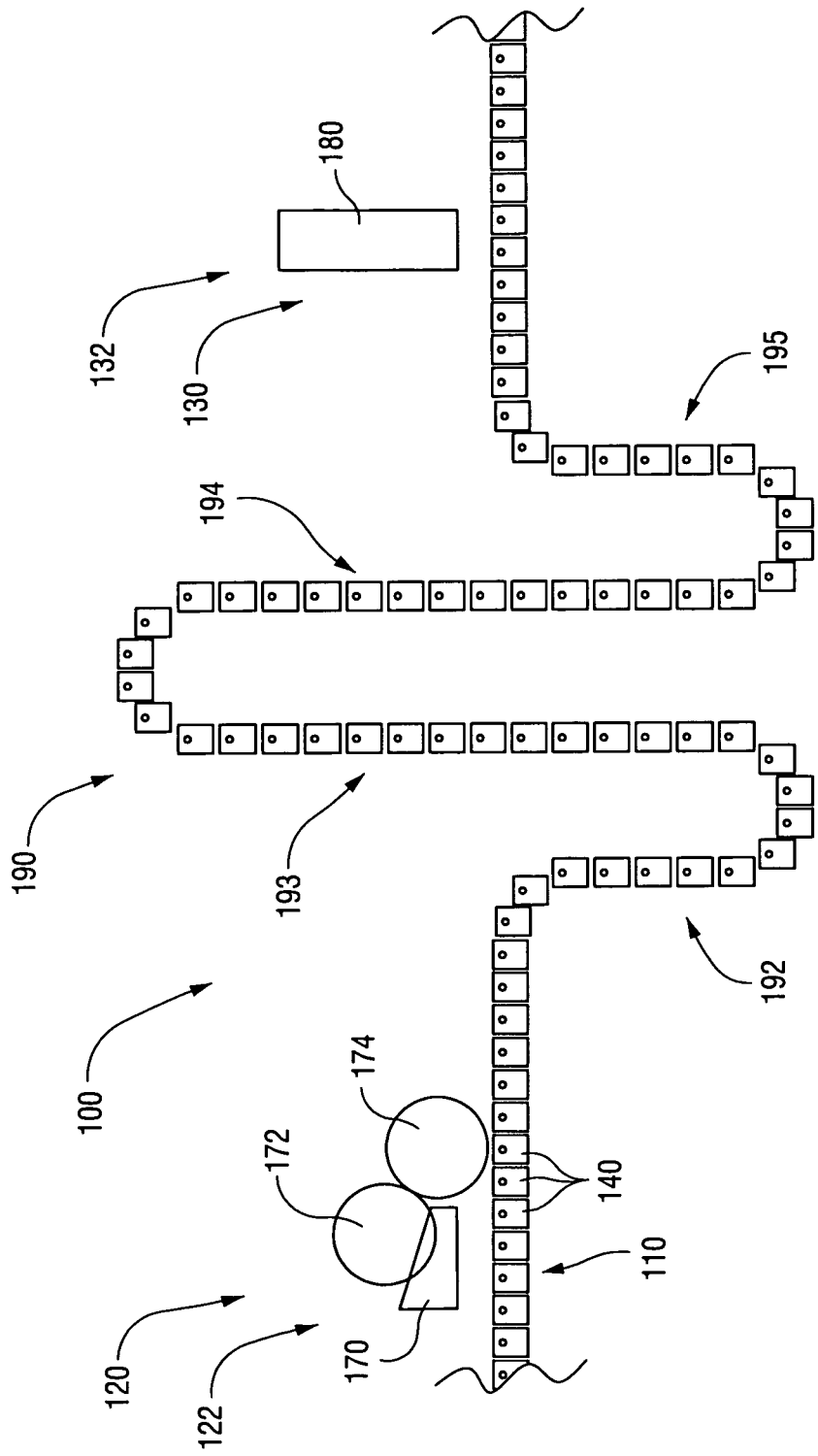
FIG. 6 is a side view of apparatus for transporting a plurality of articles according to another embodiment of the present invention.
Figure 7:
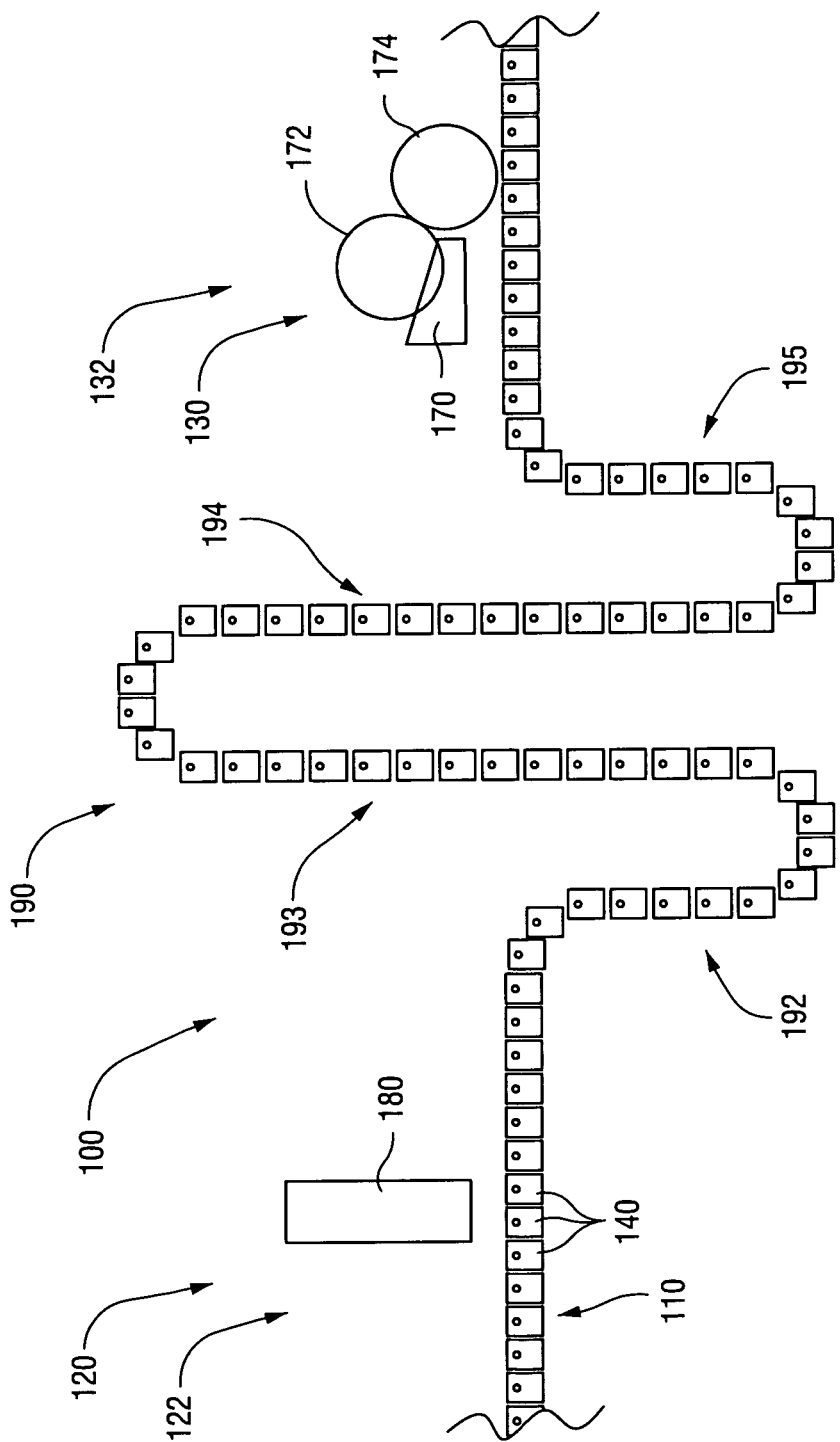
FIG. 7 is a side view of apparatus for transporting a plurality of articles according to another embodiment of the present invention.

However, one or both of the first and second marking apparatuses 122, 132 may include an inkjet printer. For example, FIG. 6 illustrates an embodiment wherein the first marking apparatus 122 includes a contact printer, e.g., an ink pan 170, design roll 172, and printing roll 174, and the second marking apparatus 132, downstream from the first marking apparatus 122, includes an inkjet printer 180. FIG. 7 illustrates an embodiment wherein the first marking apparatus 122 includes an inkjet printer 180 and the second marking apparatus 132, downstream from the first marking apparatus 122, includes an ink pan 170, design roll 172, and printing roll 174. However, the first and second marking apparatuses 122, 132 may have other suitable arrangements, e.g., both are inkjet printers 180.

In general, aspects of the invention are applicable to any process where one or more operations are performed and that require additional time, e.g., between operations. In an embodiment, at least one of the processing stations may include a drying tunnel with a heating element.

In use, the carrier bars 140 convey the articles past the first and second marking apparatuses 122, 132 that perform first and second marking operations on the articles which are coordinated with another. For example, the first and second marking apparatuses 122, 132 may serially print component images of a composite image on the articles in registered relationship with one another.

Because the image being printed on the articles is a composite image, it is preferable that the first component image printed on the articles by the first marking apparatus 122 dries before the second component image is printed on the articles by the second marking apparatus 132, e.g., to prevent smearing. To provide sufficient drying time between the first and second printing operations, the conveyer path 112 has a looping, festooning, or curved configuration between the first and second marking apparatuses 122, 132 as shown in FIGS. 3 and 5-7.

Specifically, after passing by the first marking apparatus 122, the conveyer 110 will cause the articles to pass through a loop 190 or curve before proceeding to the second marking apparatus 132. The loop 190 provides a vertical component to the conveyer path 112 between the first and second marking apparatuses 122, 132 so that the length of the conveyer path 112, and hence the travel time, between the first and second processing stations 120, 130 is increased without substantially increasing the horizontal or linear length between the first and second processing stations 120, 130. Thus, the overall size of the apparatus 100 can remain substantially the same and provide a loop 190, e.g., a drying loop, for use in providing sufficient drying time for sequential printing operations.

As illustrated, the loop 190 in the conveyer path 112 includes a first declining portion 192, a first inclining portion 193, a second declining portion 194, and a second inclining portion 195. In the illustrated embodiment, the loop 190 extends vertically higher than the remaining portions of the conveyer path. However, the loop 190 may have other configurations to increase the travel time as described below. Moreover, the conveyer 110 may provide one or more loops 190 along the conveyer path 112. In another embodiment, extra time can be created by directing articles in a serpentine path in a horizontal plane.

In order to prevent the articles from falling out of the carrier bars 140 as the carriers bars 140 travel along the loop 190 (e.g., due to gravity), the carrier bars 140 are each rotatably mounted so that the article receiving pockets 142 are maintained in a generally upwardly facing orientation.

Specifically, the conveyer 110 is in the form of a continuous chain conveyer disposed upon appropriately positioned sprockets. A motor unit is provided to operate the chain conveyer in a predetermined direction. The chain conveyer is constructed and arranged to rotatably mount, e.g., and releasably mount, the carrier bars 140 for collecting the articles from the dispenser 150 and for conveying the collected articles past the first and second marking apparatuses 122, 132.

Figure 8:
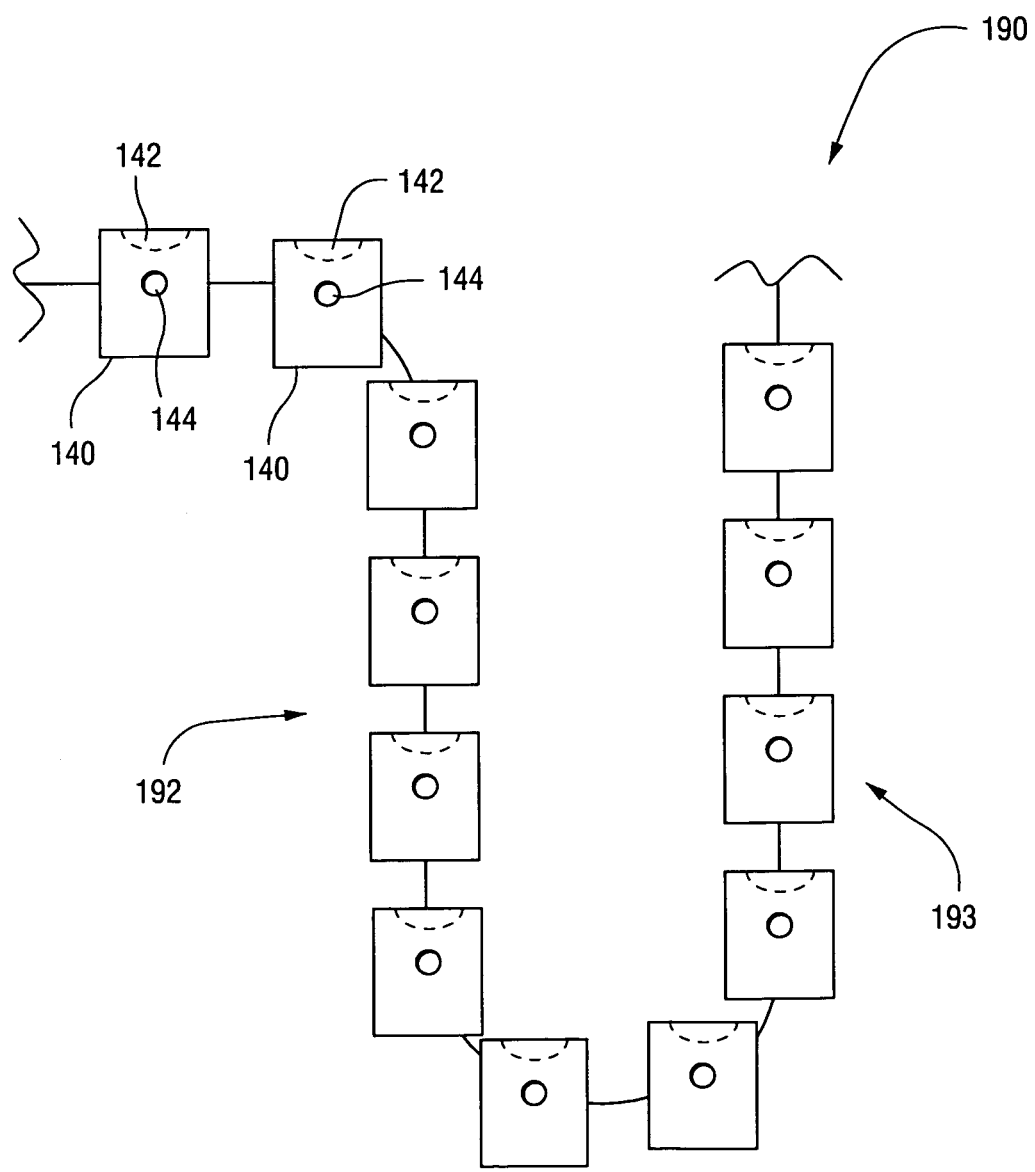
FIG. 8 is an enlarged side view of a conveyer according to an embodiment of the present invention.

As best shown in FIG. 4B, each carrier bar 140 is provided with a pin hole 144 in a side thereof. As illustrated, the pin hole 144 is offset from the center of gravity. The chain conveyer includes a plurality of mounting pins that extend into the pin hole 144 of a respective carrier bar 140. In use, each carrier bar 140 is allowed to rotate with respect the chain conveyer so that the carrier bar 140 stays in a vertical orientation which maintains the article receiving pockets 142 in a generally upwardly facing orientation as best shown in FIG. 8. However, the carrier bars may be movably mounted with respect to the chain conveyor in other suitable manners, e.g., sliding, translating, etc.

Figure 9:
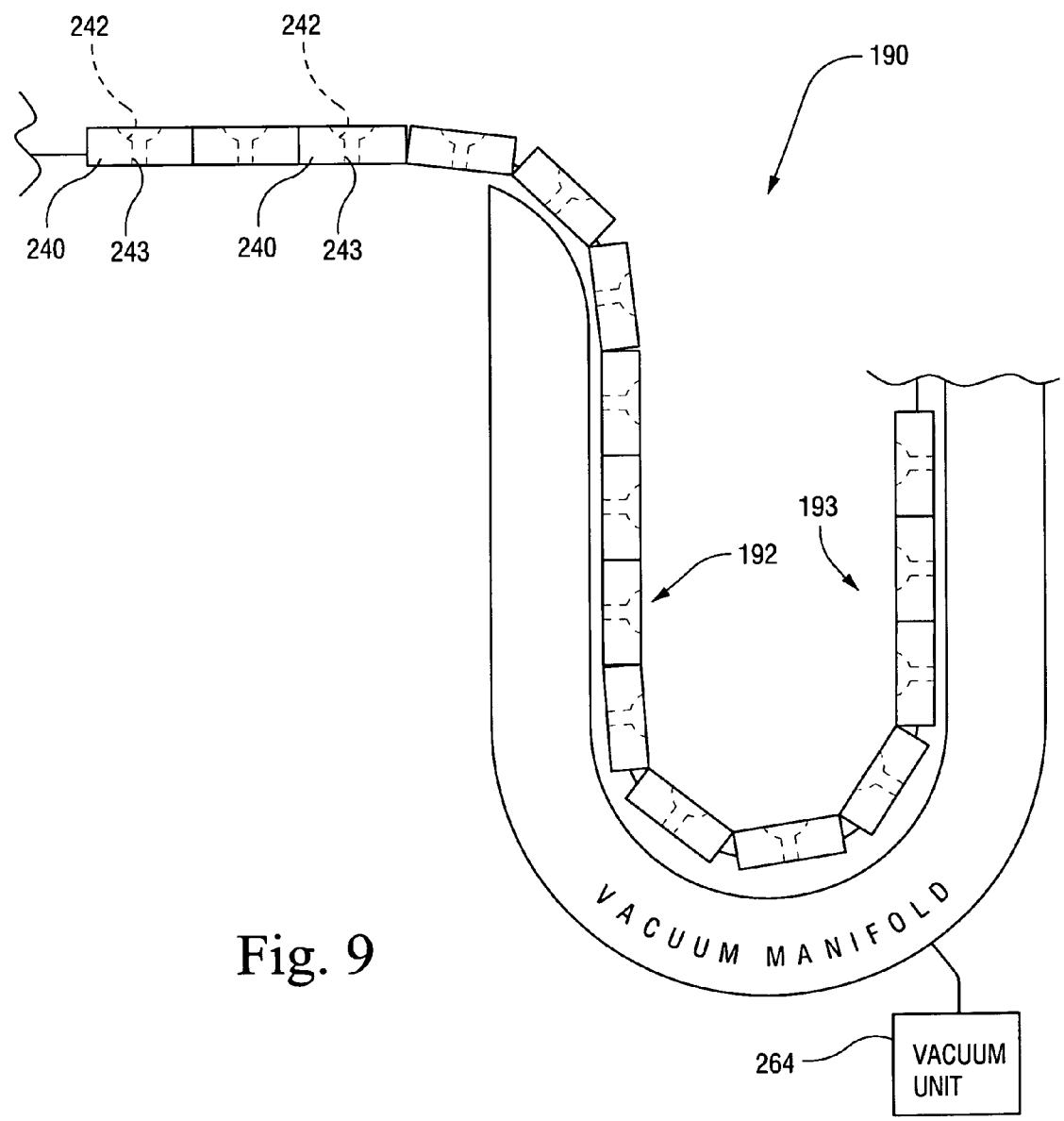
FIG. 9 is an enlarged side view of a conveyer according to another embodiment of the present invention.

In an alternative embodiment, the articles may be maintained within respective article receiving pockets of the carrier bars by a vacuum. As shown in FIG. 9, the conveyer may include carrier bars 240 that are non-rotatably mounted to the chain conveyer so that pockets 242 assume a sideways orientation as the carriers bars 240 travel along the loop 190. As illustrated, each carrier bar 240 is provided with one or more article receiving pockets 242 and a throughhole 243 extending from each pocket 242 to the bottom of the carrier bar 240. One or more vacuum units 264 may be provided on an interior portion of the conveyer and operable to provide a vacuum that maintains the articles in respective article receiving pockets 242 via the throughhole 243. The articles can be maintained in the pockets using other methods, such as shown in U.S. patent application Ser. No. 10/695,834, which is incorporated herein by reference in its entirety.

As shown in FIG. 3, the chain conveyer forms the conveyer path 112 that progresses along an incline portion 152 extending from the dispenser 150, to a generally horizontal portion 124 extending past the first marking apparatus 122, to a loop 190, to a generally horizontal portion 134 extending past the second marking apparatus 132, and through a declining portion 162 where the articles are discharged into the bin 160.

The articles may be discharged into the bin 160 in any suitable manner. For example, if the carrier bars 140 are movably mounted, e.g., rotatably, the articles may be discharged via a tilting mechanism that tilts each of the carrier bars 140 to discharge or dump the articles (see FIG. 3). Alternatively, a vacuum may be provided on an exterior portion of the conveyer to vacuum the articles from the carrier bars 140. If the carrier bars 240 are non-rotatably mounted, the articles may be discharged by releasing a vacuum provided by the vacuum unit 264 so that the articles can fall out of the carrier bars 240 at the declining portion 162 by gravity. In another embodiment, the articles may be discharged by a blower that discharges articles outwardly from the carrier bars, e.g., as disclosed in U.S. patent application Ser. No. 10/705,821, filed Nov. 13, 2003, which is incorporated herein by reference in its entirety.

Figure 10:
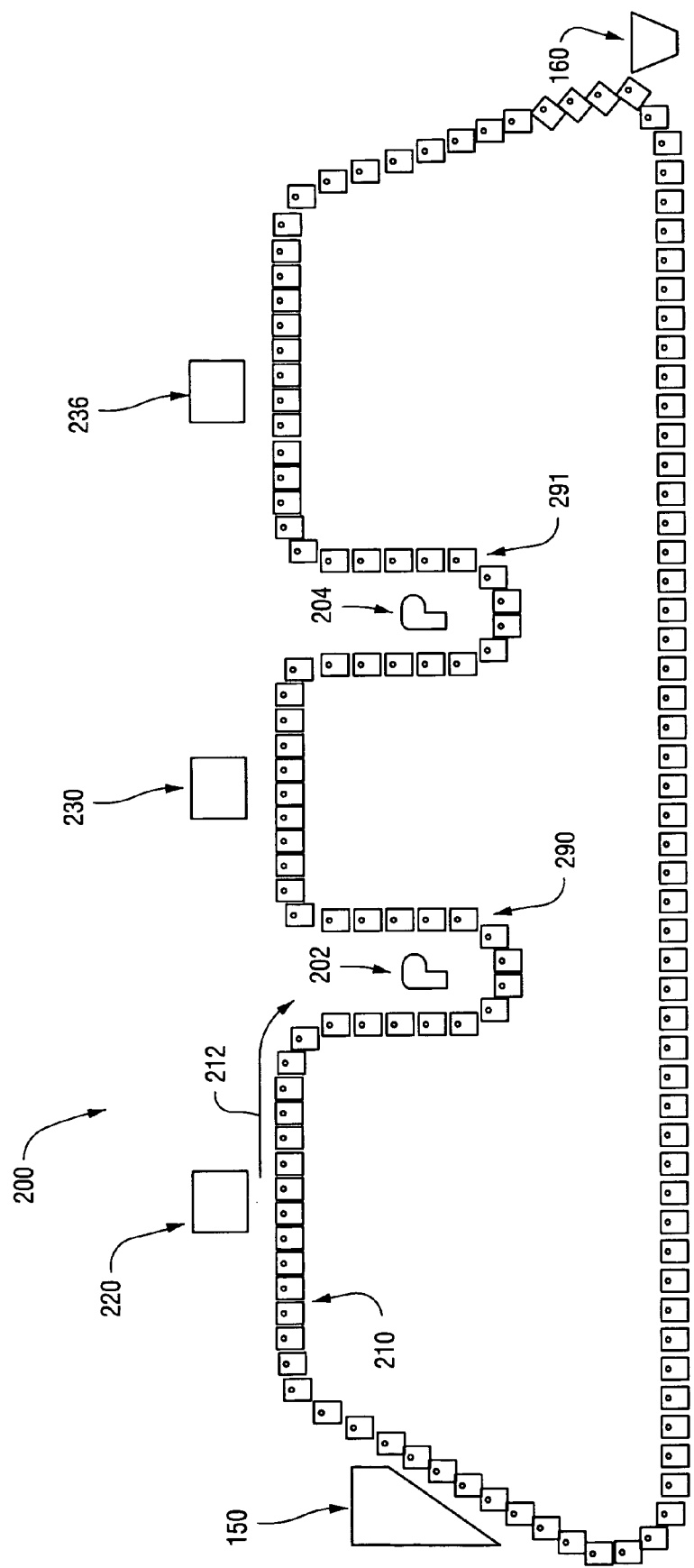
FIG. 10 is a side view of an apparatus for transporting a plurality of articles according to another embodiment of the present invention.

In the above described embodiment, the increased time between stations was utilized to increase the drying time. However, the added travel time provided by the loop 190 may also be used for performing other processing operations on the articles. For example, FIG. 10 illustrates another embodiment of an apparatus for transporting and processing a plurality of articles. As illustrated, the apparatus 200 includes a conveyer 210 to convey the articles along a conveyer path 212 and first, second, and third processing stations 220, 230, 236 provided along the conveyer path 212 to perform first, second, and third processing operations. The conveyer path 212 provides a first loop 290 between the first and second processing stations 220, 230 and a second loop 291 between the second and third processing stations 230, 236. In addition, a first supplemental processing station 202 is provided along the first loop 290 and a second supplemental processing station 204 is provided along the second loop 291.

Similar to the above-described embodiment, the first, second, and third processing stations 220, 230, 236 may be in the form of first, second, and third marking apparatuses for marking desired indicia onto the articles. The loops 290, 291 between adjacent marking apparatuses providing sufficient drying time for the sequential printing operations. Moreover, the loops 290, 291 provide additional time for performing other operations. For example, the first and second supplemental processing stations 202, 204 may be in the form of blowers and/or heaters that facilitate drying of the articles between stations. In another embodiment, the first and second supplemental processing stations 202, 204 may be in the form of inspection units configured to inspect the articles and determine if the printing operations have been properly completed. An exemplary inspection unit is disclosed in U.S. patent application Ser. No. 10/705,821, which is incorporated herein by reference in its entirety.

Figure 11:
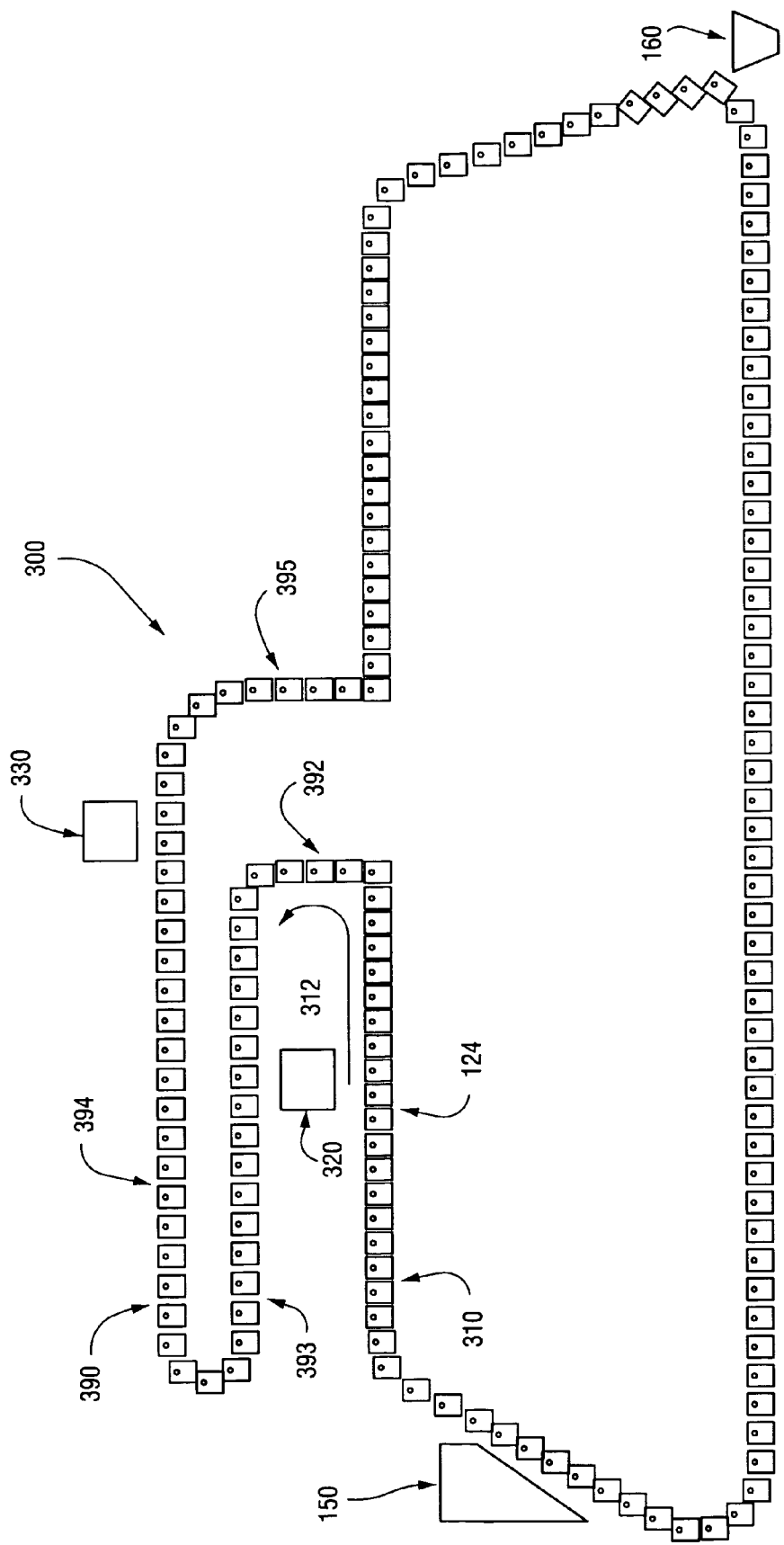
FIG. 11 is a side view of an apparatus for transporting a plurality of articles according to yet another embodiment of the present invention.

FIG. 11 illustrates another embodiment of an apparatus for transporting and processing a plurality of articles. As illustrated, the apparatus 300 includes a conveyer 310 to convey the articles along a conveyer path 312 and first and second processing stations 320, 330 provided along the conveyer path 312 to perform first and second processing operations. The conveyer path 312 provides a loop 390 between the first and second processing stations 320, 330 to increase the travel time between the first and second processing stations 320, 330. In the illustrated embodiment, the loop 390 in the conveyer path 312 includes an inclining portion 392, a first horizontal portion 393 that conveys the articles in a direction opposite to that of the horizontal portion 124, a second horizontal portion 394 that conveys the articles in the same direction as the horizontal portion 124, and a declining portion 395.

FIGS. 12A-15 illustrate another embodiment of an apparatus for transporting and processing a plurality of articles. The apparatus 400 includes a conveyer 410 to convey the articles along a conveyer path 412. In the illustrated embodiment, the conveyer path 412 includes a feed area 401, a first processing area 403, a drying zone 405, a second processing area 407, an inspection and rejection area 409, and a discharge area 411.

Figure 12A:
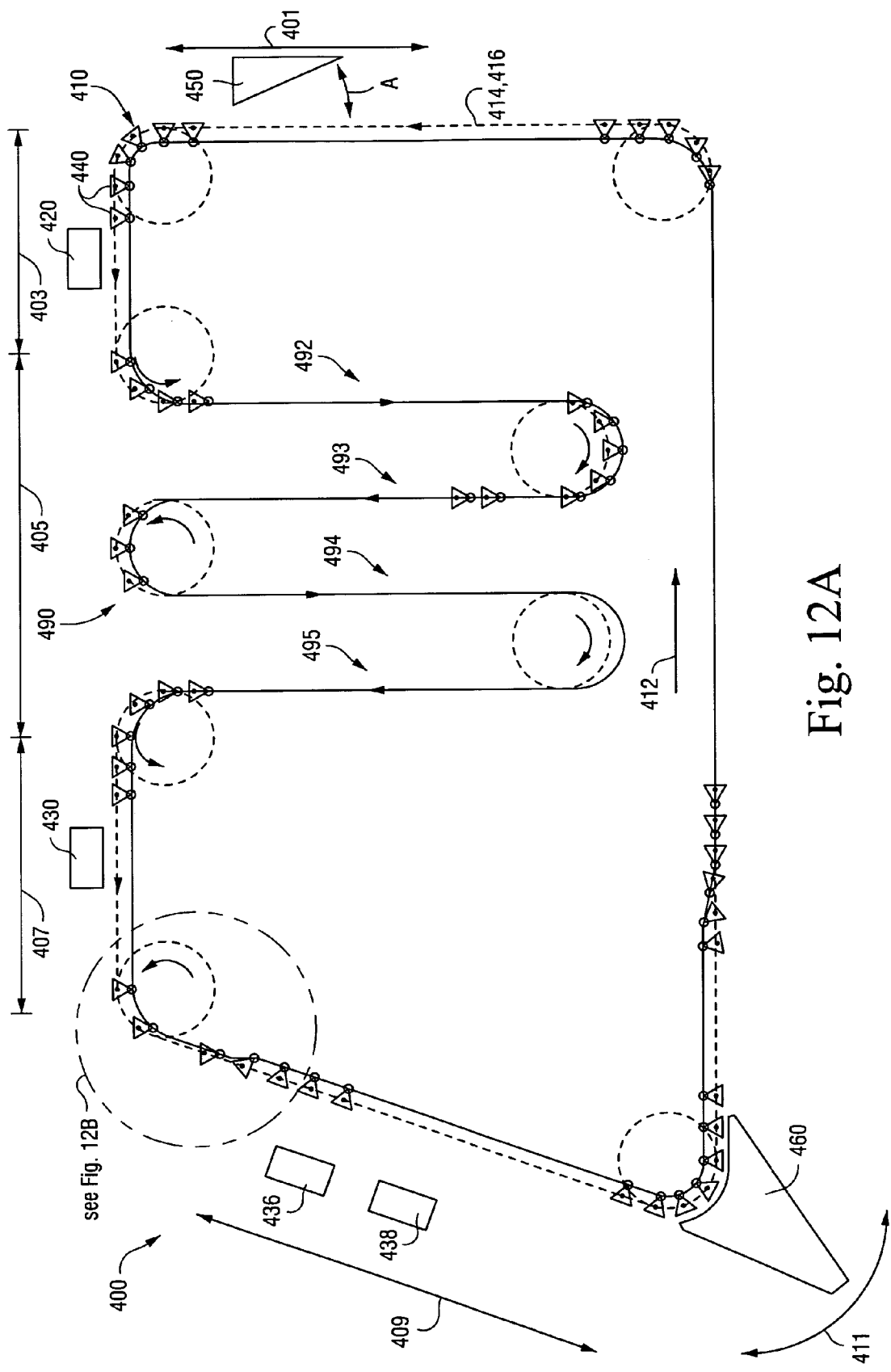
FIG. 12A is a schematic side view of an apparatus for transporting a plurality of articles according to yet another embodiment of the present invention.

As shown in FIG. 12A, a dispenser 450, e.g., feed hopper, is provided along the feed area 401 of the conveyer path 412 to receive a supply of articles and deliver the articles onto the conveyer 410. The angle A of the conveyer path 412 along the feed area 401 may be suitably adjusted to facilitate the feeding process. First and second processing stations 420, 430 are provided along the first and second processing areas 403, 407 of the conveyer path 412 to perform first and second processing operations. The first and second processing stations 420, 430 may include any suitable marking apparatus for marking or printing the articles, e.g., rotogravure, ink jet, laser drilling, etc. A loop region 490 is provided along the drying zone 405 of the conveyer path 412 to increase the travel time, and hence the drying time, between the first and second processing stations 420, 430. In the illustrated embodiment, the loop region 490 in the conveyer path 412 includes one or more loops (in this embodiment two loops). The two loops include a first declining portion 492, a first inclining portion 493, a second declining portion 494, and a second inclining portion 495. However, two or more loop regions may be provided along the drying zone 405 of the conveyer path 412. An inspection unit 436 may be provided along the inspection and rejection area 409 of the conveyer path 412 to inspect the articles and determine if printing or other operations have been properly completed. In addition, a rejection unit 438 may be provided along the inspection and rejection area 409 of the conveyer path 412 to collect rejected or non-acceptable articles identified by the inspection unit 436. A discharge bin 460 is provided along the discharge area 411 of the conveyer path 412 to collect acceptable articles identified by the inspection unit 436.

Figure 13A:
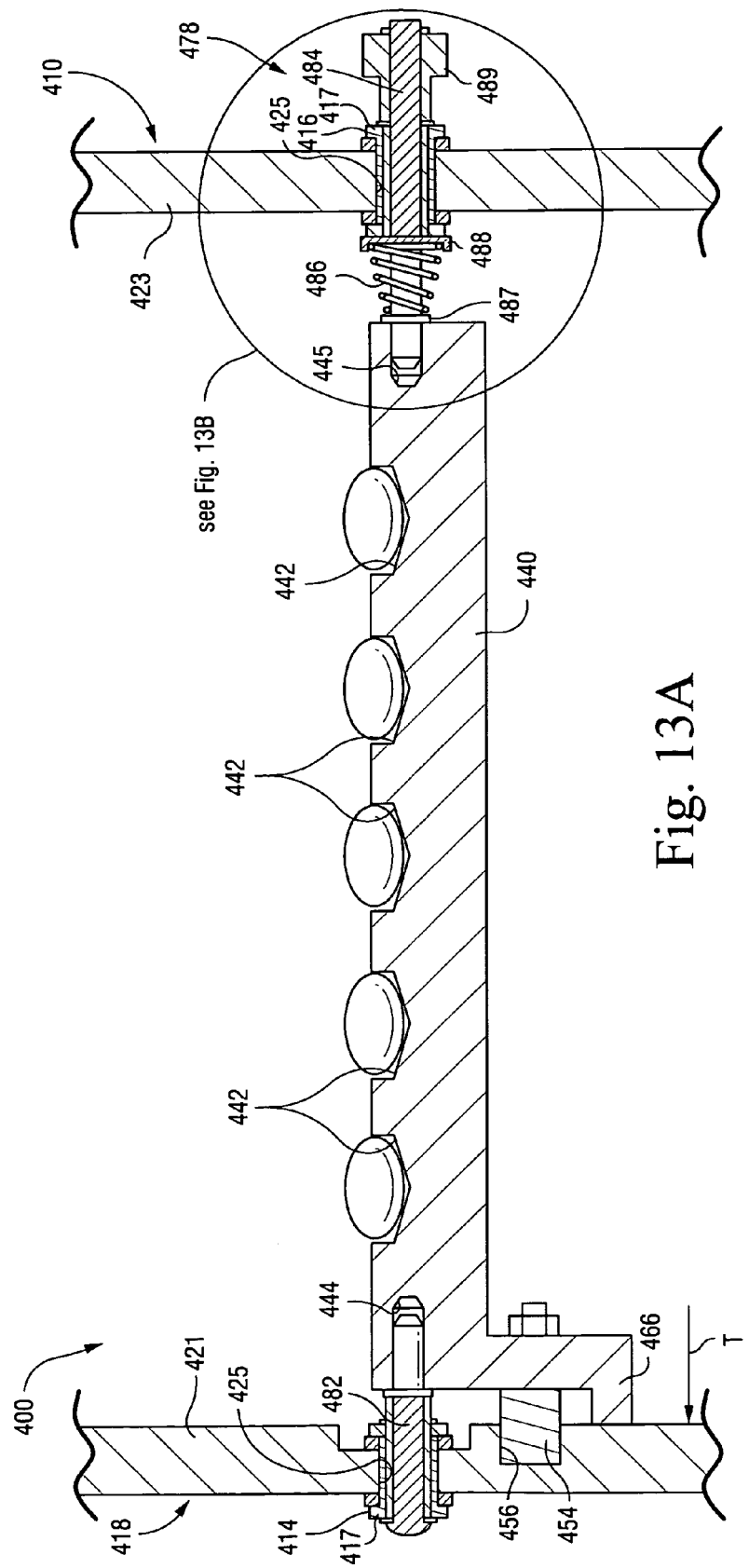
FIG. 13A is a cross-sectional view illustrating a conveyer chain support, conveyer chains, a carrier bar, and a quick-release system of the apparatus shown in FIG. 12A.
Figure 13B:
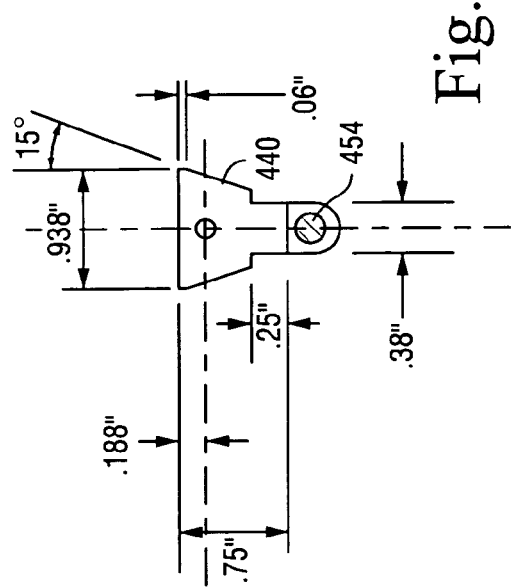
FIG. 13B is an enlarged view of a portion of FIG. 13A.

As shown in FIGS. 12A, 13A and 13B, the conveyer 410 includes first and second spaced-apart conveyer chains 414, 416 disposed upon appropriately positioned sprockets, a conveyer chain support 418 to support and guide the first and second conveyer chains 414, 416 along the conveyer path 412, a plurality of carrier bars 440 rotatably and releasably mounted between the first and second conveyer chains 414, 416, and a quick-release system 478 (FIG. 13A) to rotatably and releasably mount each carrier bar 440 between the first and second conveyer chains 414, 416. The dashed line in FIG. 12A represents the pitch line of the conveyer chains 414, 416 and carrier bar attachment. The solid line in FIG. 12A represents a cam track to control rotation of the carrier bars 440 for required processing in use, as described below.

Referring to FIGS. 13A and 13B, the conveyer chain support 418 is mounted to the main frame of the apparatus. The conveyer chain support 418 includes a first chain support 421 that supports and guides the first conveyer chain 414 and a second chain support 423 that supports and guides the second conveyer chain 416. As illustrated, each chain support 421, 423 is in the form of a guide rail and includes a continuous slot 425 for receiving and entraining the respective conveyer chain 414, 416 therein. The slot 425 forms or defines the conveyer path 412 and guides the conveyer chains 414, 416 along the same.

Each of the carrier bars 440 is provided with one or more article receiving pockets 442 disposed along its length. The pockets 442 may be suitably modified or contoured to accommodate any suitable shape and size of article. Also, each lateral side wall of the carrier bar 440 is provided with a respective pin hole 444, 445. The pin holes 444, 445 are adapted to receive respective mounting pins of the quick-release system 478.

In the illustrated embodiment, the quick-release system 478 includes a fixed mounting pin 482 adapted to extend through the conveyer chain 414 and into one pin hole 444 of a respective carrier bar 440 and a quick-release retractable mounting pin 484 adapted to extend through the other conveyer chain 416 and into the other pin hole 445 of a respective carrier bar 440. The fixed pin 482 on one side of the carrier bar 440 and the quick-release pin 484 on the other side of the carrier bar 440 allows easy insertion and extraction of the carrier bar 440 from the conveyer 410.

As best shown in FIGS. 13A and 13B, each conveyer chain 414, 416 is in the form of a hollow pin conveyer chain and includes a plurality of hollow pins 417 adapted to receive respective mounting pins therethrough. As illustrated in FIG. 13A, the fixed pin 482 extends through the hollow pin 417 of the conveyer chain 414 and into the pin hole 444 of the carrier bar 440. The fixed pin 482 may supported within the hollow pin 417 by a bushing or other suitable support member. Also, the fixed pin 482 may be fixed to the hollow pin 482 by one or more retaining members. Further, one or more bushings, spacers, or support members may be provided to support and properly align the hollow pin 417 within the slot 425 of the first chain support 421.

As shown in FIG. 13B, the quick-release pin 484 extends through the hollow pin 417 of the conveyer chain 416 and into the opposite pin hole 445 of the carrier bar 440. As illustrated, the quick-release pin 484 is in line with the fixed pin 482 to properly align the carrier bar 440. The quick-release pin 484 may supported within the hollow pin 417 by a bushing or other suitable support member. Also, one or more bushings, spacers, or support members may be provided to support and properly align the hollow pin 417 within the slot 425 of the second chain support 423.

The quick-release pin 484 is slidably mounted to the hollow pin 417 for movement between locked and released positions. A compression spring 486 biases the pin 484 into the locked position shown in FIGS. 13A and 13B. As illustrated, the spring 486 is retained between a fixed retainer 487 provided to the pin 484 and a spring retainer cup 488 movably supported by the pin 484. In use, the pin 484 may be pulled or retracted, against biasing from the spring 486, to move the pin 484 relative to the hollow pin 417. This relative movement allows the pin 484 to release from the pin hole 445 for removal or insertion of the carrier bar 440. Preferably, the spring 486 is a conical spring to save space as it can compress substantially flat in use. Also, a knob 489 is secured to the pin 484, e.g., via retaining clip, to facilitate manually movement of the pin 484.

In use, each carrier bar 440 is rotatable about the pins 482, 484 with respect the conveyer chains 414, 416 so that each carrier bar 440 can assume various orientations as it travels along the conveyer path 412. Specifically, as best shown in FIGS. 12A, each carrier bar 440 can stay in a vertical orientation to maintain the article receiving pockets 442 in a generally upwardly facing orientation as it travels along the first processing area 403, the drying zone 405, and the second processing area 407 of the conveyer path 412. Each carrier bar 440 can be rotated from a vertical orientation to allow feeding and inspection along the feed area 401 and the inspection and rejection area 409 of the conveyer path 412. Further, each carrier bar 440 can assume a generally downwardly facing orientation to discharge or dump articles along the discharge area 411 of the conveyer path 412.

Each carrier bar 440 includes a trailing pin or bearing 454 to provide positive positioning of the carrier bar 440 in order to control the orientation or rotation of the carrier bar 440 in use, e.g., allow controlled processing, inspection, and dumping of articles when necessary. In the illustrated embodiment, the trailing pin 454 is formed separately from the carrier bar 440 and fixed thereto, e.g., via a fastener. However, the trailing pin 454 may be integrally formed in one piece with the carrier bar 440.

Figure 12B:
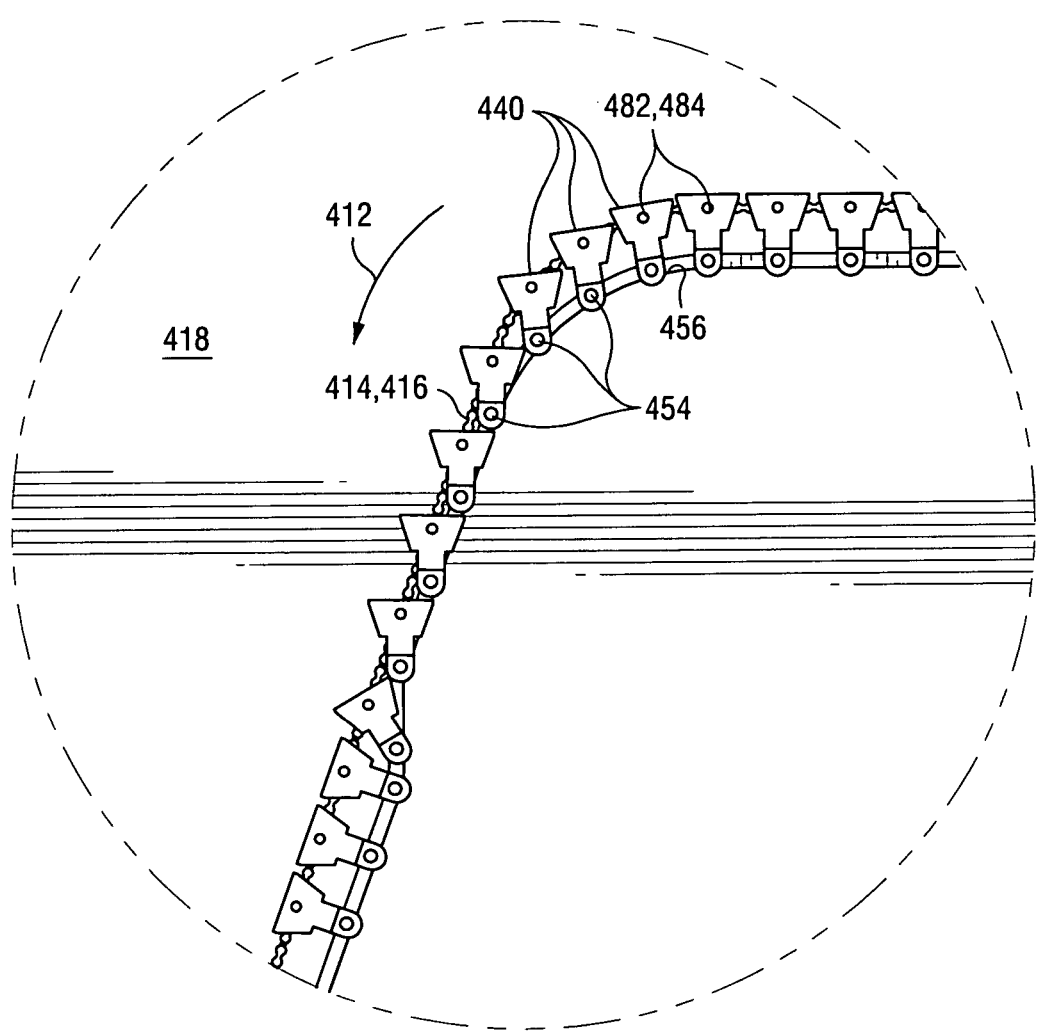
FIG. 12B is an enlarged view of a portion of FIG. 12A.

As shown in FIGS. 12A, 12B, and 13A, the trailing pin 454 is provided on an end of the carrier bar 440 and extends into a slot or cam 456 provided in the first chain support 421. The slot 456 provides a cam track (solid line in FIG. 12A) to guide the trailing pin 454 and hence control the orientation of the carrier bar 440. The slot 456 may locate the trailing pin 454 within a 360° location about the pivot pins 482, 484.

In an alternative embodiment, positive positioning of the carrier bars 440 may be provided by a magnetic or electromagnetic assembly. For example, each carrier bar 440 may include an electromagnetic device that is activated at selected locations along the conveyer path to control the orientation or rotation of each carrier bar 440 in use.

The first chain support 421 also acts as a carrier bar thrust plate to properly align the plurality of carrier bars 440. Specifically, each carrier bar 440 includes an alignment member 466 adjacent the trailing pin 454. The alignment member 466 and trailing pin 454 are biased or thrust (in the direction of the arrow T) towards the first chain support 421 by the spring load of the quick-release pin 484. As a result, the alignment member 466 of each carrier bar 440 is biased into engagement with the exterior surface of the first chain support 421 and/or the trailing member 454 of each carrier bar 440 is biased into engagement with the interior surface of the slot 456. This locates and aligns the plurality of carrier bars 440 along the first chain support 421.

Figure 14:
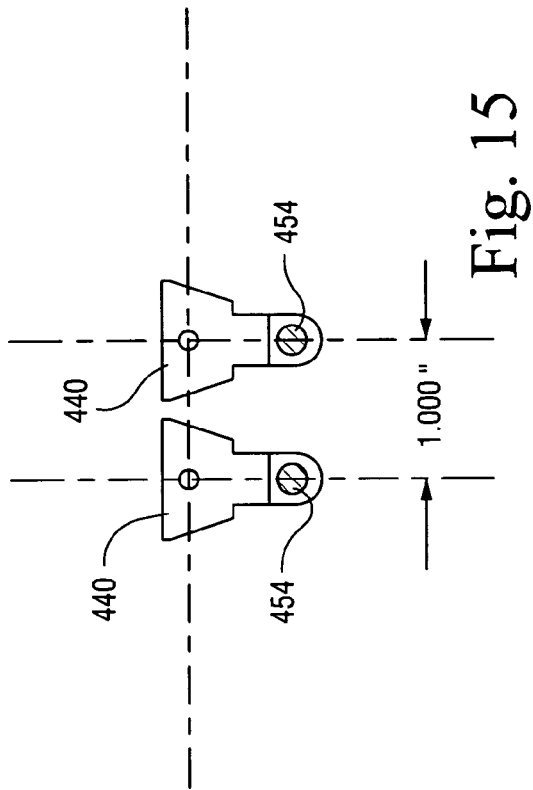
FIG. 14 is a side view of a carrier bar according to an embodiment of the present invention and showing exemplary dimensions of an embodiment.
Figure 15:
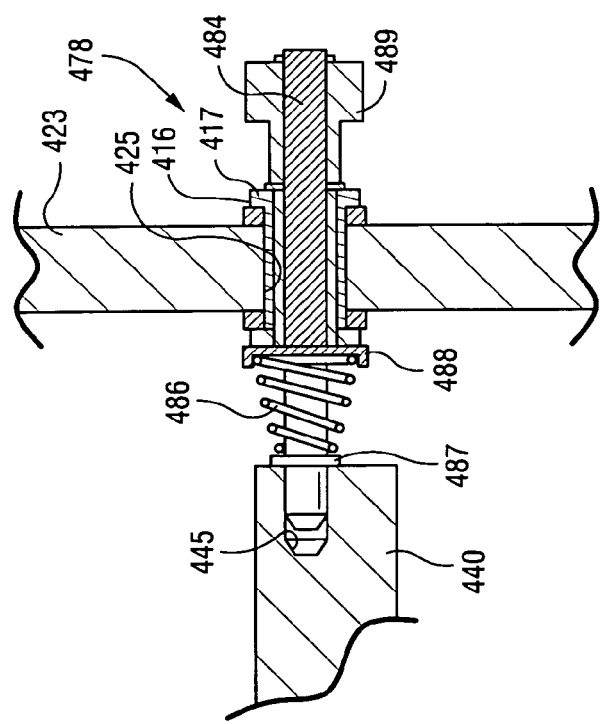
FIG. 15 is a side view showing adjacent carriers bars and showing exemplary dimensions of an embodiment.

FIG. 14 illustrates a side profile of an embodiment of the carrier bar 440, and exemplary dimensions of an embodiment. FIG. 15 illustrates an embodiment of adjacent carrier bars 440, and exemplary dimensions of the spacing therebetween in use. The illustrated size and arrangement provides sufficient clearance for full rotation about the pin axis in use.

It is noted that the conveyer chains 414, 416 and quick release system 478 may be sized and/or configured for light or heavy carrier bar applications, e.g., different pitch sizes. In an embodiment, the mounting pins 482, 484 and pin holes 444, 445 may have a diameter in the range of 0.1-0.2 in., e.g., 0.156 in. Also, it is noted that the positions of the fixed and quick-release pins 482, 484 may be reversed. In an embodiment, both mounting pins may have a quick-release configuration, and thrust plates may be provided on both sides of the carrier bars 440 for properly aligning the carrier bars 440 in use.

Also, the arrangement of the conveyer chain 414, 416, conveyer chain support 418, carrier bar 440, and/or quick-release system 478 may be incorporated into any of the other conveyer apparatuses described above.

In each of the embodiments described above, the one or more processing stations provided along the conveyer path may include any suitable configuration and the loop in the conveyer path is simply provided to increase the travel time, e.g., between sequential stations, regardless of their configuration. For example, the processing stations may be marking apparatuses, inspection units, laser cutters, drying tunnels, etc.

While the conveyer is described as being implemented into a printing system of the type described above, having multiple print operations spaced out over a conveyor path, it may be implemented into other printing or processing systems. That is, the printing system is merely exemplary, and aspects of the present invention may be incorporated into any suitable processing system, e.g., laser cutting, inspection, etc., in which additional travel time is desired.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. An apparatus for transporting and processing a plurality of articles, the apparatus comprising:
   an endless conveyer structured to convey a plurality of articles along a continuous, closed loop conveyer path; and
   at least first and second processing stations provided along the continuous, closed loop conveyer path to perform at least first and second processing operations, respectively, the second processing station being physically located downstream from the first processing station,
   wherein the continuous, closed loop conveyer path includes at least one loop or festoon within the endless conveyer between the first and second processing stations, and
   wherein the first processing operation completes while the plurality of articles moves through the at least one loop or festoon.

2. The apparatus according to claim 1, wherein the conveyer includes a plurality of carrier bars structured to convey the plurality of articles along the conveyer path.

3. The apparatus according to claim 2, wherein each of the carrier bars includes one or more article receiving pockets along its length.

4. The apparatus according to claim 3, wherein each of the carrier bars is movably mounted so that the article receiving pockets are maintained in a generally upwardly facing orientation.

5. The apparatus according to claim 3, wherein each of the carrier bars includes a throughhole extending from each of the pockets that is configured to allow a vacuum to maintain the articles in respective pockets.

6. The apparatus according to claim 3, wherein each of the carrier bars is movably mounted so that the article receiving pockets can be inverted to dump or release articles.

7. The apparatus according to claim 2, wherein each of the carrier bars includes a pin hole offset from the center of gravity that is adapted to engage a respective pin provided by the conveyer.

8. The apparatus according to claim 7, wherein the pin is a quick-release pin that is movable between locked and released positions.

9. The apparatus according to claim 8, wherein the quick-release pin is biased into the locked position by a spring.

10. The apparatus according to claim 2, wherein each of the carrier bars includes a trailing pin that is adapted to follow a cam track to control orientation of each of the carrier bars.

11. The apparatus according to claim 1, wherein the articles include pharmaceutical, edible, and non-edible articles.

12. The apparatus according to claim 1, wherein the first and second processing stations include first and second marking apparatuses for marking desired indicia onto the articles.

13. The apparatus according to claim 12, wherein at least one of the first and second marking apparatuses includes an ink pan, a design roll, and a printing roll.

14. The apparatus according to claim 12, wherein at least one of the first and second marking apparatuses includes an inkjet printer.

15. The apparatus according to claim 12, wherein the loop or festoon includes a travel length to provide sufficient drying time between the first and second marking apparatuses.

16. The apparatus according to claim 1, wherein the loop or festoon provides at least one vertical or non-horizontal component to the conveyer path.

17. The apparatus according to claim 16, wherein the loop or festoon includes at least one declining vertical portion and at least one inclining vertical portion.

18. The apparatus according to claim 1, further comprising at least one supplemental processing station provided along the loop or festoon.

19. The apparatus according to claim 18, wherein the supplemental processing station includes a blower or heater.

20. The apparatus according to claim 18, wherein the supplemental processing station includes an inspection unit.

21. The apparatus according to claim 1, wherein the at least one loop or festoon is provided upstream from the at least one processing station.

22. The apparatus according to claim 1, wherein the at least one loop or festoon is provided downstream from the at least one processing station.

23. A method for transporting and processing a plurality of articles, the method comprising:
conveying the plurality of articles along an endless and continuous, closed loop conveyer path past at least first and second processing stations to perform at least first and second processing operations, respectively;
conveying the plurality of articles along a loop or festoon of the endless and continuous, closed loop conveyer path between the first and second processing stations, the second processing station being physically located downstream from the first processing station; and
completing the first processing operation while the plurality of articles are conveyed along the loop or festoon.

24. The method according to claim 23, wherein the conveying the plurality of articles along a loop or festoon includes providing a travel length that provides sufficient drying time between the first and second processing stations.

25. The method according to claim 23, wherein the conveying the plurality of articles along a loop or festoon includes conveying the plurality of articles along at least one declining vertical portion and at least one inclining vertical portion.

26. The method according to claim 23, further comprising:
transporting the articles on a plurality of carrier bars; and
selectively adjusting an orientation of each said carrier bar along the conveyor path.

27. The apparatus according to claim 1, wherein the at least one loop or festoon increases a travel length of the conveyer path which increases a travel time between the first and second processing stations.

28. The apparatus according to claim 1, wherein the at least one loop or festoon increases the travel length without substantially increasing a horizontal or linear length between the first and second processing stations.

29. The apparatus according to claim 1, wherein the at least one loop or festoon is provided along a portion of the conveyer path that extends between and interconnects the first and second processing stations.

30. The apparatus according to claim 1, wherein the first and second processing stations are sequential along the conveyor path and the at least one loop or festoon increases a travel length of the conveyer path between the first and second processing stations.

31. The apparatus according to claim 1, wherein the endless conveyer includes a continuous chain conveyor disposed about appropriately positioned sprockets.

32. The apparatus according to claim 31, wherein the endless conveyer includes a plurality of carrier bars structured to convey the plurality of articles along the continuous conveyer path, each of the carrier bars being rotatable with respect to the chain conveyor to allow each of the carrier bars to assume various orientations.

33. The apparatus according to claim 32, wherein each of the carrier bars includes one or more article receiving pockets along its length, and each of the carrier bars is rotatable to allow the article receiving pockets to be maintained in a generally upwardly facing orientation along at least a portion of the conveyer path.

34. The apparatus according to claim 1, wherein the first and second processing stations are provided along respective horizontal portions of the continuous conveyer path and at least a portion of the loop or festoon includes a declining portion that extends vertically lower or below the horizontal portions.

35. The apparatus according to claim 1, wherein the loop or festoon includes a first vertically declining portion, a first vertically inclining portion, a second vertically declining portion, and a second vertically inclining portion arranged between horizontal portions of the conveyer path.

36. The apparatus according to claim 1, wherein the endless conveyer includes a continuous loop of carrier bars structured to convey the plurality of articles along the continuous, closed loop conveyer path.

37. The apparatus according to claim 1, wherein the first and second processing stations provide first and second sequential marking apparatuses for marking desired indicia onto the articles, and the at least one loop or festoon increases a travel length of the conveyer path which increases a travel time between the first and second marking apparatuses thereby providing sufficient drying time between the first and second marking apparatuses.

38. An apparatus for transporting and processing a plurality of articles, the apparatus comprising:
an endless conveyer structured to convey a plurality of articles along a conveyer path;
a dispenser structured to deliver the plurality of articles to the endless conveyer; and
at least first and second processing stations provided along the conveyer path to perform at least first and second processing operations, respectively,
wherein the conveyer path includes at least one loop or festoon within the conveyer between the first and second processing stations,
wherein the endless conveyer includes a continuous loop of carrier bars structured to convey the plurality of articles along the conveyer path, and wherein the first and second processing stations provide first and second sequential marking apparatuses for marking desired indicia in a registered relationship onto the articles, and the at least one loop or festoon increases a travel length of the conveyer path which increases a travel time between the first and second marking apparatuses thereby providing sufficient drying time between the first and second marking apparatuses.

39. The apparatus according to claim 38, wherein the conveyer path includes a continuous, closed loop.

40. The apparatus according to claim 39, wherein the first and second processing stations are provided along respective horizontal portions of the continuous conveyer path and at least a portion of the loop or festoon includes a declining portion that extends vertically lower or below the horizontal portions.

41. The apparatus according to claim 1, further comprising a discharge device structured to discharge the plurality of articles from the continuous, closed loop conveyer path.

42. The method according to claim 23, further comprising discharging the plurality of articles from the continuous, closed loop conveyer path.

43. The apparatus according to claim 38, further comprising a discharge device, downstream from the first and second processing stations, structured to discharge the plurality of articles from the endless conveyer.

44. An apparatus for transporting and processing a plurality of articles, the apparatus comprising:
- an endless conveyer structured to convey a plurality of articles along a continuous, closed loop conveyer path; and
- at least first and second processing stations provided along the continuous, closed loop conveyer path to perform at least first and second processing operations, respectively, the second processing station being physically located downstream from the first processing station,
- wherein the continuous, closed loop conveyer path includes at least one loop or festoon within the endless conveyer between the first and second processing stations, and
- wherein each of the first and second processing stations is configured to create respective first and second adaptations in the articles, the first and second adaptations being in registration with one another.

* * * * *